Patented July 4, 1933

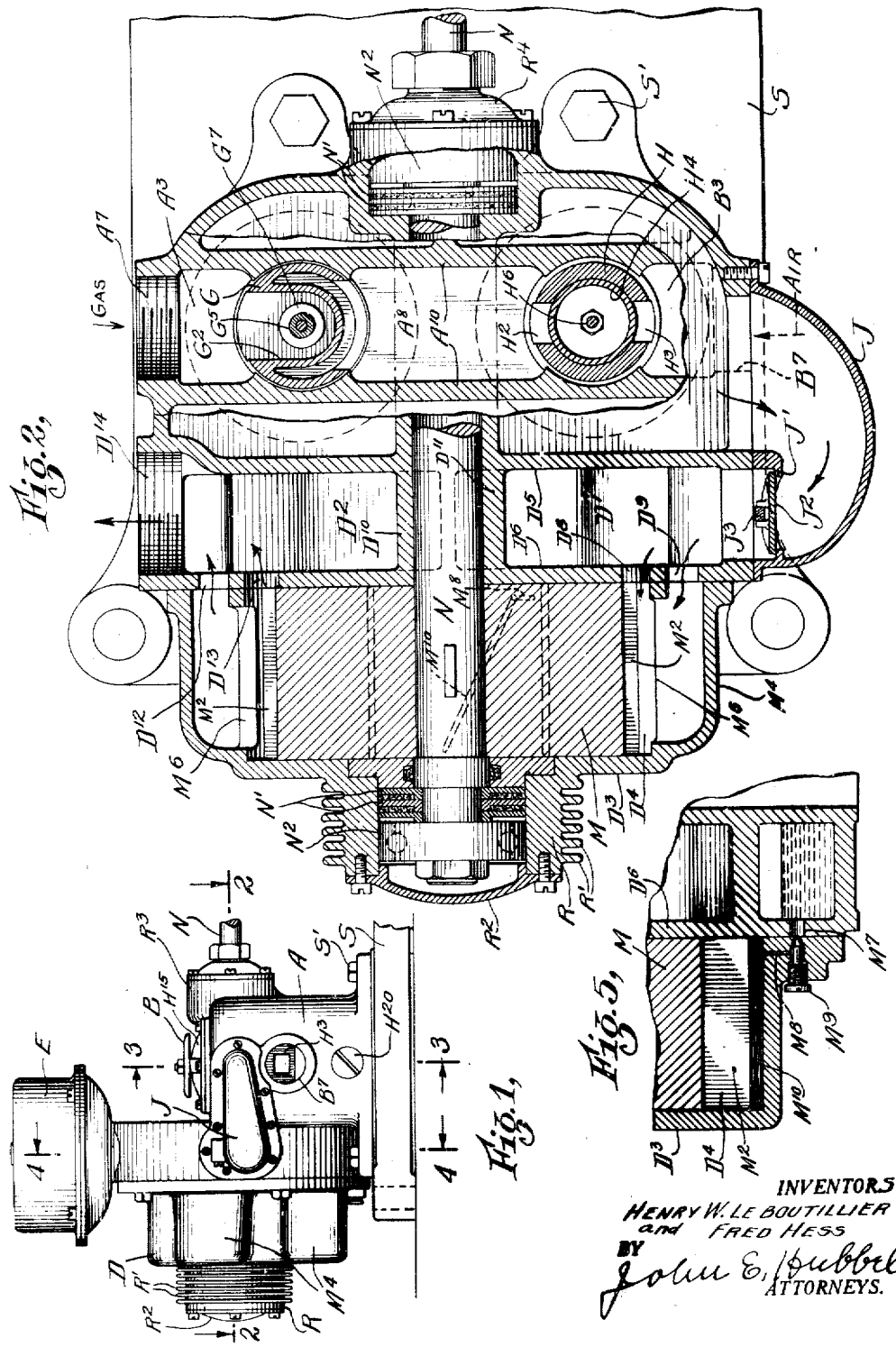

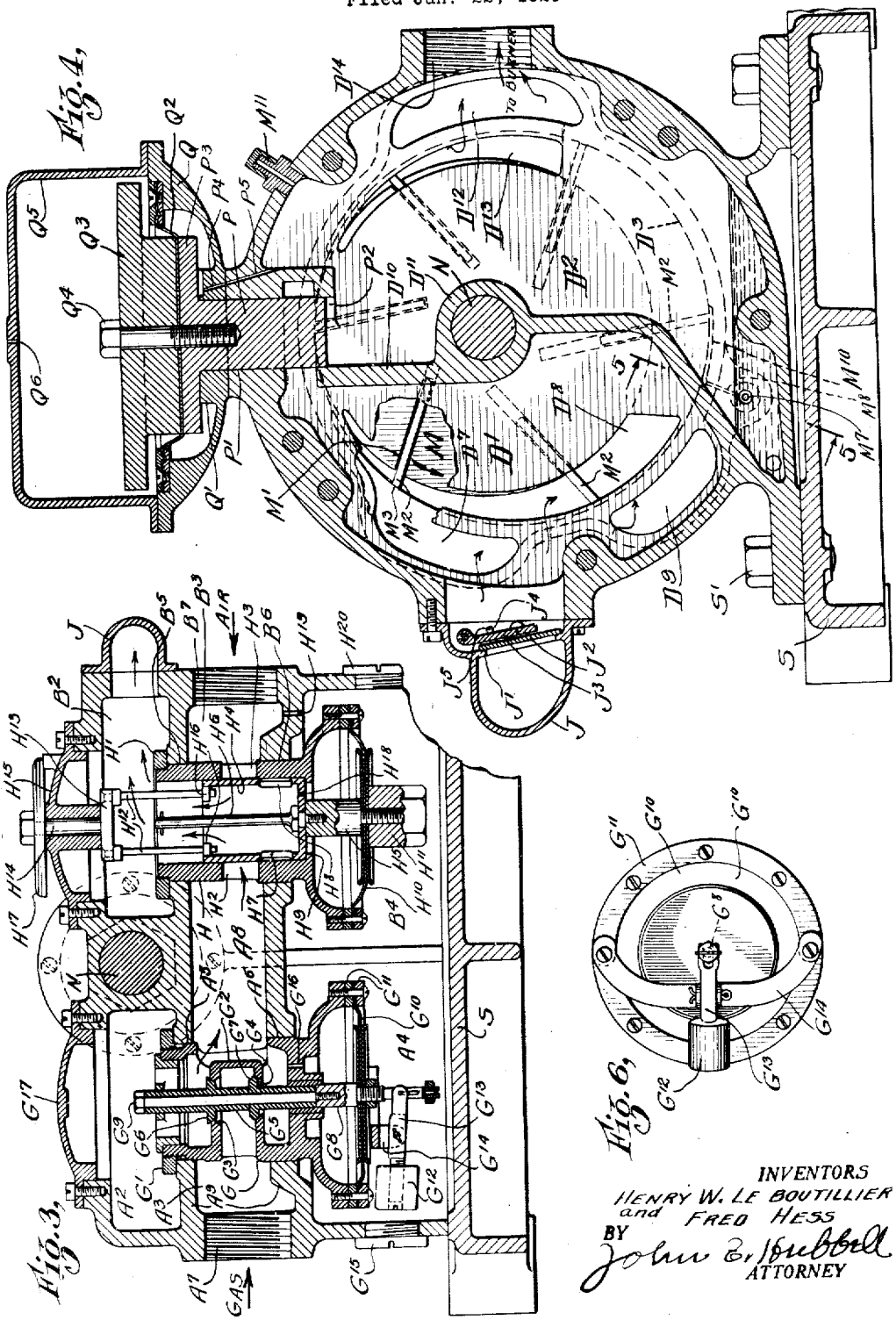

1,917,040

UNITED STATES PATENT OFFICE

HENRY W. LE BOUTILLIER, OF DREXEL HILL, AND FRED HESS, OF PHILADELPHIA, PENNSYLVANIA, ASSIGNORS TO THE SELAS COMPANY, OF PHILADELPHIA, PENNSYLVANIA, A CORPORATION OF NEW YORK

MIXING AND COMPRESSING MACHINE

Application filed January 22, 1929. Serial No. 334,335.

The present invention relates to machines for mixing and compressing a plurality of gases in predetermined proportions and in particular our machine is especially applicable for the mixing and compressing of combustible gas and air in explosive or non-explosive proportions. The object of our invention is to provide an improved construction and mode of operation of a gas mixing and compressing machine characterized by a material reduction in the number of parts, weight and floor space occupied; improved provisions for cleaning, repairing, and replacing parts; simple and effective means for regulating and controlling the gas proportions; low manufacturing cost, and a reduction in the cost of operation.

The various features of novelty which characterize our invention are pointed out with particularity in the claims annexed to and forming a part of this specification. For a better understanding of the invention, however, and the advantages possessed by it reference should be had to the accompanying drawings and descriptive matter in which we have illustrated and described a preferred embodiment of the invention.

Of the drawings:

Fig. 1 is an elevation of the machine as assembled;

Fig. 2 is a horizontal section on the line 2—2 of Fig. 1;

Fig. 3 is a vertical section on the line 3—3 of Fig. 1;

Fig. 4 is a vertical section on the line 4—4 of Fig. 1;

Fig. 5 is a vertical section on the line 5—5 of Fig. 4— and

Fig. 6 is a bottom view of the gas governor.

In the drawings, a preferred embodiment of our improved mixing and compressing machine is illustrated which broadly comprises a gas governor unit A into which combustible gas at varying pressures is passed and discharged at atmospheric pressure, a mixer unit B in which the entering gas is mixed with air in predetermined proportions irrespective of the demand on the machine, a check valve for preventing back pressure on the mixer, and a constant speed rotary compressor D in which the air and gas mixture is compressed and issues at a pressure automatically maintained constant by a pressure governor E controlling a by-pass connection from the compressor outlet to the compressor inlet. When air and gas are being mixed in non-explosive proportions, the mixture is delivered through suitable conduits to a burner of the Bunsen type (not shown) in which the balance of the air required for complete combustion is induced before the mixture enters the combustion chamber.

As shown most clearly in Figs. 2 and 3, the machine includes a gas governor unit A and a mixer unit B arranged in side by side relation in the machine body at one side of a vertical partition $D^5$. The portion of the body in which the gas governor unit is positioned, is divided into an enlarged upper, a restricted intermediate, and an enlarged lower chamber $A^2$, $A^3$ and $A^4$, respectively, by a pair of vertically spaced horizontal partitions $A^9$. The intermediate chamber $A^3$ is limited in width by substantially parallel vertical walls $A^{10}$ extending between the horizontal partitions $A^9$ and connected to the upper chamber $A^2$ by a tapered opening $A^5$ and to the lower chamber $A^4$ by a tapered opening $A^6$ slightly larger than and in axial alignment with the opening $A^5$. A gas supply conduit is connected to the chamber $A^3$ at $A^7$ and a gas delivery passage $A^8$ is formed in the opposite portion of the chamber. The supply and delivery passages are separated by a tapered cage G fitting in and projecting through the openings $A^5$ and $A^6$.

The cage G is adjustably secured in position by a clamp nut $G'$ threaded on the upper end of the cage and resting on the upper partition $A^9$. The cage is provided with a cylindrical partition $G^2$ open at the side adjacent the gas inlet and having upper and lower tapered valve seats $G^3$ and $G^4$, respectively, through which gas can pass to the delivery passage $A^8$. A tubular valve stem $G^5$ having spaced valve discs $G^6$ and $G^7$ integral therewith is positioned in the cage with the discs $G^6$ and $G^7$ resting on and closing the ports $G^3$ and $G^4$, respectively. A valve stem $G^8$ is detachably connected to the lower end of the valve stem $G^5$ by a threaded bolt $G^9$ extending through the valve stem $G^5$ and threaded into the upper end of the stem $G^8$. Upper and lower valve stem guide members are mounted in vertically spaced portions of the cage.

The amount of gas passing through the cage to the passage $A^8$ is regulated by pressure responsive means responsive to the pressure differential existing between the pressure of the gas in the passage $A^8$ and the pressure of the atmosphere. The pressure responsive means preferably comprise a flexible diaphragm $G^{10}$ secured to the valve stem $G^8$ in the chamber $A^4$. The circumferential portion of the diaphragm is positioned between rings $G^{11}$ secured to the enlarged bell-shaped lower end of the cage. A counterweight $G^{12}$ is adjustable on a fork $G^{13}$ having an intermediate portion pivoted on a support $G^{14}$ and its other end extending through to a slot in the portion of the valve stem $G^8$ below the diaphragm. A plug $G^{15}$ normally closes an opening in the machine body through which the position of the weight can be adjusted manually.

The position of the weight $G^{12}$ is adjusted until the weight of the movable valve parts is balanced and the valve is in a position of equilibrium. When in operation, the lower side of the diaphragm is subjected to the pressure of the atmosphere existing in the chamber $A^4$, which is open to a corresponding chamber in the mixer section hereinafter described. The upper diaphragm side is subjected to the pressure of the gas in the passage $A^8$ by a small passage $G^{16}$ opening thereto. A removable cap $G^{17}$ closes the top of the chamber $A^2$ and permits access to the governor parts in that chamber. When the pressure of the gas in the passage $A^8$ falls below atmospheric due to the suction created by the compressor D, the diaphragm rises and opens the valve ports to permit gas to pass into the passage until the pressures on the opposite sides of the diaphragm are equal. As the pressure differential on the diaphragm will increase with the demand, this arrangement permits maximum gas flow with maximum demand. The above described provisions will thus maintain a supply of combustible gas in the passage $A^8$ at atmospheric pressure irrespective of variations in the gas pressure in the inlet passage $A^7$.

The mixer unit B, illustrated in Figs. 2 and 3, in which the combustible gas and air is mixed in predetermined proportion is located in an adjacent portion of the body which is divided into chambers $B^2$, $B^3$ and $B^4$ by the partitions $A^9$ and proportioned and arranged similarly to the corresponding chambers of the gas governor. A tapered mixer cage H passes through axially aligned tapered openings $B^5$ and $B^6$ in the upper and lower partitions, respectively, and is held in position at its upper end by a clamp nut $H'$. An inlet B from atmosphere opens to one side of the chamber $B^3$. The portion of the cage H in the chamber $B^3$ is formed with rectangular openings $H^2$ and $H^3$, connecting the mixer chamber within the cage with the gas passage and air inlet, respectively. A sliding valve sleeve $H^4$, closed at its lower end, is positioned within the cage H and arranged for vertical movements therein by means of a diaphragm rod $H^5$ connected to a diaphragm $H^{10}$ hereinafter described. The rod $H^5$ is detachably connected to a vertical rod $H^6$, portions of the rods being spaced apart to provide a swivel mounting for the sleeve $H^4$. Valve ports $H^7$ and $H^8$ corresponding in form and area to the cage openings $H^2$ and $H^3$, respectively, are formed in opposite side portions of the sleeve. An internal flange $H^9$ on the cage limits the downward movement of the sleeve. The rod $H^5$ is arranged in contact with a flexible diaphragm $H^{10}$, a reduced threaded extension of the rod passing through the center of the diaphragm. The diaphragm $H^{10}$ is connected to the bell-shaped lower end of the cage H in the same manner as the gas governor diaphragm arrangement previously described. A nut $H^{11}$, threaded on the rod extension, holds the diaphragm and rod in engagement. The nut $H^{11}$ and rod $H^5$ are so proportioned that the weight of these parts is sufficient to restore the sleeve $H^4$ to its lowermost position, as shown in Fig. 3, when the compressor is stopped.

Vertical rods $H^{12}$ guide the vertical movements of the valve sleeve $H^4$ and prevent relative rotation thereof. The guide rods are rigidly connected at their upper ends to a horizontal bar $H^{13}$ which has a vertical stem $H^{14}$ rotatably mounted in a central boss on the mixer cap $H^{15}$. The lower ends of the rods pass through lugs $H^{16}$ on the inner side of the sleeve. A hand wheel $H^{17}$ having various air-gas ratio settings indicated thereon at spaced points, is secured to the upper end of the stem $H^{14}$. A passage $H^{18}$ in the lower end of the sleeve provides communication between the mixer chamber and the upper side of the diaphragm $H^{10}$. An opening $H^{19}$ in the lower partition $A^9$ ensures atmospheric pressure in the chambers $B^4$ and $A^4$. A removable plug $H^{20}$ in the side of the body provides access to the chamber $B^4$. The diaphragms of the gas governor and mixer units are preferably made of leather positioned between a pair of metal discs.

With the mixer apparatus described, air and gas can be mixed in any predetermined proportion by volume within the limits of the machine. The desired ratio is set by rotating the sleeve until a corresponding portion of the width of the ports $H^7$ and $H^8$ is in register with the openings H² and H³, respectively. The air and gas ratio being set, the total amount of air and gas entering the mixer chamber will be proportional to the demand of the compressor. When the compressor is stopped the parts assume by gravity the position shown in Fig. 3 and no air or gas can pass into the mixer chamber. When the compressor is operating, the pressure in the mixer chamber is less than atmospheric and the diaphragm H¹⁰ is forced upwardly a proportionate distance by the pressure differential thereon and the ports and openings coincide to permit the air and gas to enter in the predetermined volumetric proportions. The air and gas mixture passes out of the mixer chamber through the upper chamber B² into a housing J leading to the inlet side of the compressor.

The housing J is positioned horizontally on the side of the machine and is provided at its end adjacent the compressor with a check valve J². At that end the housing is formed with an angular valve seat J' against which the check valve seats. The valve J² is pivotally mounted on a horizontal pin on a valve lever J³, which is pivoted at its upper end to the housing. Lugs J⁴ on the rear side of the valve project beyond the lever and are connected at their ends by a pin J⁵ to limit the pivotal movement of the valve relative to the lever.

When the compressor is operating and there is no demand for its output, the pressure building up in the compressor forces the check valve to seat and thereby prevents back pressure on the mixer diaphragm. The check valve remains open during normal operation of the machine and permits the gas and air mixture to pass to the compressor and closes by its own weight when the compressor stops.

The compressor portion of the machine comprises inlet and outlet chambers D' and D², respectively formed in the machine body and an outer cup-shaped housing D³ enclosing a rotor chamber D⁴. The vertical partition D⁵ separates the inlet and outlet chambers from the mixer and the gas governor chambers, respectively and a horizontally spaced vertical partition D⁶ separates the first mentioned chambers from the rotor chamber. The housing D³ is separable from the remaining portion of the body and secured thereto by a plurality of stud bolts. When the compressor is operating the air and gas mixture is drawn through the check valve into the inlet chamber D', from which it passes through a plurality of irregularly shaped inlet ports D⁷, D⁸ and D⁹ in the partition D⁶ into the rotor chamber D⁴.

In the rotor chamber D⁴ a cylindrical rotor M is mounted on a shaft N, which is rotatably mounted in the hub D¹¹ of a curved partition D¹⁰. The latter extends between the parallel partitions D⁵ and D⁶ and separates the rotor inlet and outlet chambers from one another. The hub extends between the chambers A² and B² of the gas governor and mixer respectively, as shown in Figs. 2 and 3. The shaft N is provided with a plurality of packing rings N' and a bearing N² at each end thereof and is connected by a suitable coupling to the drive shaft of a constant speed electric motor (not shown).

As shown in Fig. 4 the rotor M is formed with a plurality of inclined slots M', each of which extends from a point adjacent the center to the circumference of the rotor. In the construction shown, each slot is at an angle of substantially 12° with a radial line drawn to the circumferential end of the slot and the circumferential end of each slot is angularly spaced about 60° from the corresponding end of each adjacent slot. A blade or vane M², preferably of fibre, bronze or other material having good wearing properties is slidably mounted in each slot and formed with an inclined outer edge M³, which contacts with the side and circumferential walls of the rotor housing D³. The cylindrical housing D³ is constructed and arranged eccentrically to the rotor M. The ports D⁷ and D⁹ communicate with chambers formed in circumferential bulged portions M⁴ of the housing which open directly to the rotor chamber through openings M⁵. The inlet port D⁸ opens to the rotor chamber directly.

With the eccentric arrangement of the rotor and housing shown, the blades M² are entirely within the periphery of the rotor when they reach the highest point in the path of rotation. As the rotor moves from this point through an arc of 180°, the distance between the circumferential surface of the rotor and the wall D³ progressively increases and the blades slide outwardly due to centrifugal force and remain in contact with the housing wall. The air and gas mixture is sucked in during this portion of the movement. The compressing begins as each blade reaches the end of the inlet opening D⁸. The distance between the rotor and wall decreases through the remaining portion of the rotor travel. The compressing action continues until the blades reach the mixture outlet ports D¹² and D¹³ at the opposite side of the rotor chamber from the inlet ports. The port D¹² communicates with the rotor chamber through one of the expanded portions M⁴ and an opening M⁶ therein and the port D¹³ in in the partition D⁶ opens directly to the rotor chamber. The mixture issuing from the outlet ports enters the outlet chamber D², from which it passes through the passage D¹⁴ to the burners.

The mixture passing out of the outlet chamber D² is maintained at a predetermined constant pressure by a pressure governor mounted directly above the inlet and outlet chambers of the rotor. In the construction shown the pressure governor comprises a cylindrical piston P positioned in an opening P' in the top of the outlet chamber casing. The piston is arranged for vertical movements to open and close a by-pass port P² formed in a horizontal extension of the partition D¹⁰ and connecting the outlet and inlet chambers. The upper portion of the piston is enlarged to form a disc P³ normally resting on a raised portion Q' of a cap Q which is mounted on a boss surrounding the opening P'. Aligned passageways P⁴ and P⁵ connect the outlet chamber D² with the underside of a diaphragm Q² mounted in the cap Q. A removable weight Q³ is supported on the diaphragm and piston disc and secured in position by a stud bolt Q⁴. A casing Q⁵ is positioned on the cap Q and formed with an atmospheric connection Q⁶.

With the pressure governor construction described, the compressor outlet pressure on the lower end of the piston and underside of the diaphragm is opposed to the weight of the parts plus the atmospheric pressure on the weight and diaphragm. The size of the weight is proportioned in accordance with the desired delivery pressure to be maintained so that when the delivery pressure exceeds a predetermined amount, for example three and one-half pounds per square inch, the piston will be raised to open the by-pass connection to the inlet side of the compressor. The pressure on the delivery side of the compressor is thus maintained at a predetermined value irrespective of the demand on the machine.

Means are provided for supplying oil under pressure from a body of oil in the lower part of the compressor outlet chamber to the inner side of the rotor housing D³. The oil is subjected to the delivery pressure of the compressor which forces the oil through passages M⁷ and M⁸ into a groove M¹⁰ in the bottom of the rotor chamber. The amount of oil passing to the rotor chamber is governed by an adjustable needle valve M⁹. The oil is supplied to the bottom of the outlet chamber through a filling plug M¹¹ in the body.

The rotor housing is formed with an extension R which surrounds the packing rings N' and shaft bearing N². The extension has a plurality of heat dissipating flanges R' on its outer surface. A cap R² closes the outer end of the extension. The opposite end of the machine is similarly provided with an extension R³ and a cap R⁴ having a central opening through which the shaft N passes.

The machine is mounted on a base S and connected thereto by stud bolts S' passing through flanged portions formed on the body of the machine.

When repairs or replacements are necessary to the gas governor or mixer, the stud bolts connecting the base and machine are removed and the machine tilted to permit the removal and replacement of the gas governor or mixer units. In this operation the top cap is removed and the corresponding clamping nut disconnected to permit the removal of the unit from the machine. A new unit may then be inserted and secured in place. No difficulty is found in removing or inserting the units due to the tapered form of the cages and partition openings. The unitary construction also permits the assembling and testing of the governor and mixer elements before insertion in the machine. The position of the counterweight in the gas governor unit can be adjusted without stopping the machine.

All of the parts are quite simple in construction and can be manufactured at a relatively low cost. The machine is unusually compact and requires a small amount of floor space. The inclined arrangement of the rotor blades increases the effectiveness of the compressor by reducing the friction therein. The capacity of the rotor can be increased by inserting a rotor unit of greater width, involving only the removal of the housing and rotor unit. The rotor parts can be inspected and cleaned without taking down the rotor.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features. Our invention is adapted for the mixing and compressing of gases other than air and combustible gas, for example, acetylene and gas or oxygen and gas may be operated on with little, if any, change in the present construction and arrangement.

Having now described our invention what we claim as new and desire to secure by Letters Patent, is:

1. Apparatus for mixing a plurality of gases in a predetermined volumetric ratio and at the same pressure and compressing the same which comprises a gas supply conduit in which the gas pressure is variable and normally above a predetermined pressure, means for admitting gas from said conduit and reducing its pressure to said predetermined pressure, a second gas supply conduit containing another gas at said predetermined pressure, means for mixing said gases in a predetermined volumetric ratio and at said predetermined pressure, a compressor unit arranged to receive said gases from said mixing means, means associated with said gas mixing means for regulating the amounts of gas admitted to the latter directly in accordance with the demand on said compressor unit, and means for maintaining said volumetric ratio constant irrespective of variations in demand.

2. Apparatus for mixing air and gas in a predetermined volumetric ratio and at atmospheric pressure and compressing the same which comprises a gas supply conduit in which the gas pressure is variable and normally above atmospheric pressure, means for admitting gas from said conduit and reducing its pressure to atmospheric pressure, an air supply conduit connected to atmosphere, means for mixing said air and gas in a predetermined volumetric ratio and at atmospheric pressure, a compressor unit arranged to receive the air-gas mixture from said mixing means, means associated with said mixing means for regulating the amounts of air and gas admitted to the latter directly in accordance with the demand on said compressor unit, and means for maintaining said volumetric ratio constant irrespective of variations in demand.

3. Apparatus for mixing a plurality of gases in a predetermined volumetric ratio and compressing the same which comprises means for admitting a gas at a pressure corresponding to the pressure of a second gas and means for mixing said gases in a predetermined volumetric ratio, said means being arranged side by side and having a conduit connection therebetween, and a compressor unit arranged at one side of said gas admission means and said mixing means and receiving said gases from said mixing means, said compressor unit having a rotor shaft extending between said gas admission means and said mixing means.

4. Apparatus for mixing a plurality of gases in a predetermined volumetric ratio and compressing the same which comprises a casing having means for admitting a gas at a pressure corresponding to the pressure of a second gas and means for mixing said gases in a predetermined volumetric ratio, said means being arranged side by side in said casing and having a conduit connection therebetween, and a compressor unit arranged in said casing at one side of said gas admission means and said mixing means and receiving said gases from said mixing means, said compressor unit having a rotor shaft extending through said casing between said gas admission means and said mixing means.

5. Apparatus for mixing a plurality of gases in a predetermined volumetric ratio and compressing the same which comprises a casing having a gas governor unit for admitting a gas at a predetermined pressure, a second gas supply connection, and a mixing unit for mixing said gases in a predetermined volumetric ratio, said units being arranged side by side in said casing and having a conduit connection therebetween, and a compressor unit arranged in said casing at one side of said gas governor and mixing units and receiving said gases from said mixing unit, said compressor unit having an inlet chamber adjacent said mixing unit, an outlet chamber adjacent said gas governor unit, and a rotor shaft mounted in said casing and arranged to extend between said gas governor and mixing units.

6. In gas mixing apparatus the combination of a casing having a gas passage therein, a gas governor unit comprising a cage positioned in and closing said passage, a valve controlled port in said cage, and pressure responsive means below said passage arranged to control the gas flow through said port in accordance with the demand on said apparatus, said unit being detachably secured in, and bodily removable from said casing.

7. In gas mixing apparatus the combination of a casing having a gas passage formed therein axially aligned tapered openings in said casing at opposite sides of said passage, a gas governor unit adapted to control the passage of gas through said passage comprising a tapered cage positioned in said openings, a valve port in said cage, a valve controlling said port, and pressure responsive valve operating means positioned in the lower end of said cage.

8. In gas mixing apparatus the combination of a casing having a gas passage formed therein, and axially aligned tapered openings in said casing at opposite sides of said passage, a gas governor unit adapted to control the passage of gas through said passage comprising a tapered cage positioned in said openings, a valve port in said cage, a valve controlling said port, a diaphragm positioned in the lower end of said cage and subjected to atmospheric pressure on its lower side, a passage connecting the upper side of said diaphragm to the outlet side of said cage, and means connecting said valve and diaphragm.

9. In gas mixing apparatus the combination of a casing having a gas passage formed therein and axially aligned tapered openings in said casing at opposite sides of said passage, a gas governor unit adapted to control the passage of gas through said passage comprising a tapered cage positioned in said openings, a valve port in said cage, a valve controlling said port, a diaphragm positioned in the lower end of said cage, a passage connecting the upper side of said diaphragm to the outlet side of said cage, and means connecting said valve and diaphragm, and means releasably securing said unit in position in said body.

10. In gas mixing apparatus the combination of a casing having an opening in its lower end, a mixing unit for mixing a plurality of gases in definite proportions and a gas governor unit for regulating the admission of one of said gases to said mixing unit, and means for suspending said units in said casing above said opening therein, each of said units being bodily removable through said opening.

11. Gas mixing apparatus having a pair of gas inlet openings at spaced points therein, a passage connecting said openings, means for mixing said gases in definite proportions positioned in said passage and arranged to receive gases from said inlets at a predetermined pressure, a gas governor unit arranged in said passage between said mixing means and one of said inlets and having a valve port therein, a valve for opening and closing said port, a differential pressure diaphragm below said valve, and a valve stem detachably connected to said diaphragm.

12. Gas mixing apparatus having a pair of gas inlet openings at spaced points therein, a passage connecting said openings, means for mixing said gases in definite proportions positioned in said passage and arranged to receive gases from said inlets at a predetermined pressure, a gas governor unit arranged in said passage between said mixing means and one of said inlets, said mixing means and said gas governor unit each including a cage member and means for controlling the gas flow therethrough, each of said means being actuated by a differential pressure diaphragm, and means for removably mounting each of said diaphragms in position on the corresponding cage member.

13. Gas mixing apparatus comprising in combination, a casing having a passage therein, a gas mixing unit removably mounted in said casing and positioned in said passage and comprising means for mixing a plurality of gases in definite proportions, and an opening formed in the lower portion of said casing for the bodily insertion and removal of said mixing unit.

14. Gas mixing apparatus comprising a casing having a mixing unit for mixing a plurality of gases in definite proportions, means for supplying a plurality of gases to said mixing unit, said mixing unit comprising a valve cage having gas ports in the sides thereof, a sleeve rotatable in said cage and having gas ports in the sides thereof adapted to register with said cage ports, said sleeve having a mixture outlet in its upper end, pressure responsive means mounted on the lower end of said cage and operatively connected to said sleeve, means for rotating said cage to vary the mixing ratio, and means restricting the sleeve to vertical movements only for each position of said last mentioned means.

15. Gas mixing apparatus comprising a casing having a mixing unit for mixing a plurality of gases in definite proportions removably mounted therein, means for supplying a plurality of gases to said mixing unit, said mixing unit comprising a valve cage having gas ports in the sides thereof, a clamp nut securing the upper end of said cage to said casing, a sleeve rotatable in said cage and having gas ports in the sides thereof adapted to register with said cage ports, said sleeve having a mixture outlet in its upper end, a differential pressure diaphragm mounted on the lower end of said cage and connected to said sleeve, means for rotating said cage to vary the mixing ratio, and means for restricting the sleeve to vertical movements only for each position of said last mentioned means.

16. In gas mixing apparatus, the combination with a casing having a gas passage therein, of a gas governor unit detachably secured in, and bodily removable from said casing and comprising a cage positioned in and closing said passage, a valve mounted in said cage and controlling gas flow through said passage and operating means for said valve mounted on said cage and comprising a differential pressure responsive member and adjustable means regulating the action of said member.

17. In gas mixing apparatus, the combination with a casing having a gas passage therein, of a gas governor unit and a mixing unit each detachably secured in, and bodily removable from said casing and each comprising a cage positioned in and closing said passage the two cases being positioned in separated portions of said passage, a valve mounted in each cage, the valve in said governor unit controlling gas flow into, and the valve in said mixer unit controlling gas flow out of said passage, and individual operating means for each valve mounted on the corresponding cage and comprising a pressure responsive member.

18. An apparatus of the class described, comprising a casing having first and second inlet ports, a sleeve valve movably mounted in said casing and having ports cooperating with said first and second ports, first and second gas-tight chambers, a movable partition separating said chambers, an outlet port for the casing communicating with the valve ports and with the first gas-tight chamber, means operatively connecting the movable partition and valve for causing movement of the partition to impart longitudinal movement to the valve, means for turning the valve to circumferentially adjust the valve ports relatively to said first and second ports, the means for rotaing the valve including slidably connected pin members and socket members, said last mentioned means preventing rotation of the valve during longitudinal movement of the latter and means for moving certain of said members about the axis of said valve.

19. An apparatus of the class described, comprising gas-tight compartments, a movable partition separating one compartment from the other, first and second inlet ports opening into one of said compartments, a tubular piston valve having ports cooperating with said first and second inlet ports, an outlet port communicating with the valve ports through one end of said piston and also with the last mentioned compartment, means operatively connecting the valve to said movable partition, means for rotating said valve for varying the registration of its ports with said first and second ports, and means placing the other one of said compartments in communication with the upstream side of one of the inlet ports.

20. An apparatus of the class described, comprising a casing having first and second inlet ports, a sleeve valve movably mounted in the casing and having ports cooperating with said inlet ports, first and second gas-tight chambers, a movable partition separating said chambers, an outlet port for the casing communicating with the valve ports through one end of said sleeve valve and also with the first gas-tight chamber, means operatively connecting the movable partition and valve for causing movement of the partition to impart longitudinal movement to the valve, manually controlled means for turning the valve to circumferentially adjust the valve ports relatively to the inlet ports, and means placing the second gas-tight chamber in communication with the upstream side of one of the inlet ports.

Signed at Philadelphia, in the county of Philadelphia and State of Pennsylvania this 18th day of January, A. D. 1929.

HENRY W. LE BOUTILLIER.
FRED HESS.

CERTIFICATE OF CORRECTION.

Patent No. 1,917,040.  July 4, 1933.

HENRY W. Le BOUTILLIER, ET AL.

It is hereby certified that the State of Incorporation of the assignee in the above numbered patent was erroneously described and specified as "New York" whereas it should have been described and specified as "Pennsylvania", as shown by the records of assignments in this office; and that the said Letters Patent should be read with this correction therein that the same may conform to the record of the case in the Patent Office.

Signed and sealed this 29th day of August, A. D. 1933.

M. J. Moore.
Acting Commissioner of Patents.

(Seal)

able partition separating one compartment from the other, first and second inlet ports opening into one of said compartments, a tubular piston valve having ports cooperating with said first and second inlet ports, an outlet port communicating with the valve ports through one end of said piston and also with the last mentioned compartment, means operatively connecting the valve to said movable partition, means for rotating said valve for varying the registration of its ports with said first and second ports, and means placing the other one of said compartments in communication with the upstream side of one of the inlet ports.

20. An apparatus of the class described, comprising a casing having first and second inlet ports, a sleeve valve movably mounted in the casing and having ports cooperating with said inlet ports, first and second gas-tight chambers, a movable partition separating said chambers, an outlet port for the casing communicating with the valve ports through one end of said sleeve valve and also with the first gas-tight chamber, means operatively connecting the movable partition and valve for causing movement of the partition to impart longitudinal movement to the valve, manually controlled means for turning the valve to circumferentially adjust the valve ports relatively to the inlet ports, and means placing the second gas-tight chamber in communication with the upstream side of one of the inlet ports.

Signed at Philadelphia, in the county of Philadelphia and State of Pennsylvania this 18th day of January, A. D. 1929.

HENRY W. LE BOUTILLIER.
FRED HESS.

CERTIFICATE OF CORRECTION.

Patent No. 1,917,040.  July 4, 1933.

HENRY W. Le BOUTILLIER, ET AL.

It is hereby certified that the State of Incorporation of the assignee in the above numbered patent was erroneously described and specified as "New York" whereas it should have been described and specified as "Pennsylvania", as shown by the records of assignments in this office; and that the said Letters Patent should be read with this correction therein that the same may conform to the record of the case in the Patent Office.

Signed and sealed this 29th day of August, A. D. 1933.

(Seal)

M. J. Moore.
Acting Commissioner of Patents.

CERTIFICATE OF CORRECTION.

Patent No. 1,917,040. July 4, 1933.

HENRY W. Le BOUTILLIER, ET AL.

It is hereby certified that the State of Incorporation of the assignee in the above numbered patent was erroneously described and specified as "New York" whereas it should have been described and specified as "Pennsylvania", as shown by the records of assignments in this office; and that the said Letters Patent should be read with this correction therein that the same may conform to the record of the case in the Patent Office.

Signed and sealed this 29th day of August, A. D. 1933.

M. J. Moore.
Acting Commissioner of Patents.

(Seal)